Feb. 6, 1951 — J. C. HAUN — 2,540,668
PLUG VALVE
Filed Jan. 20, 1945
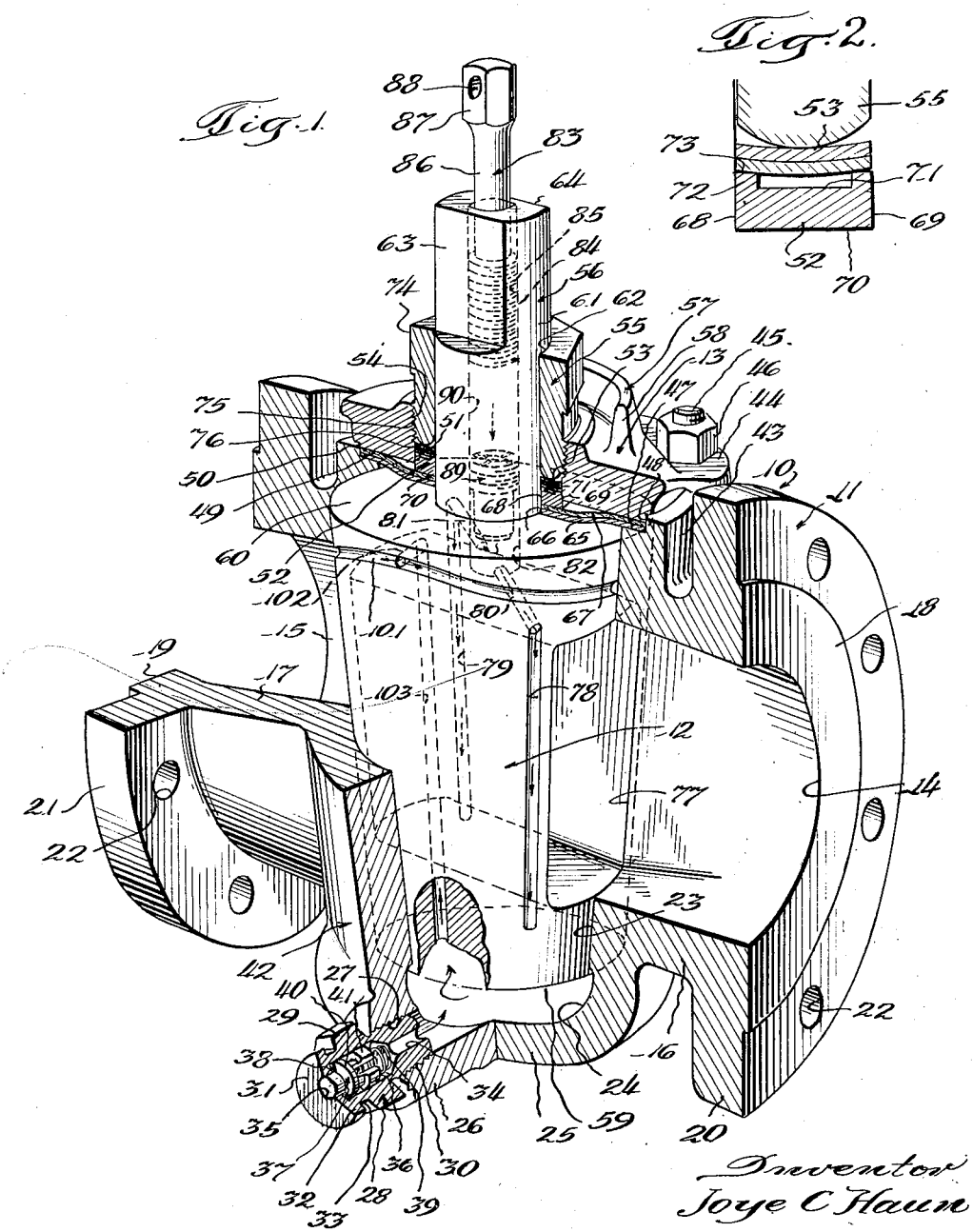
Inventor
Joye C Haun
By McColeb, Wendt & Dickinson
attorneys Patented Feb. 6, 1951

2,540,668

UNITED STATES PATENT OFFICE 2,540,668

PLUG VALVE

Joye C. Haun, San Francisco, Calif., assignor to Electric Steel Foundry, Portland, Oreg., a corporation of Oregon Application January 20, 1945, Serial No. 573,757

3 Claims. (Cl. 251—103)

The present invention relates to plug valves and is particularly concerned with plug valves of the lubricated type and plug valves provided with arrangements for lifting the plug valve off its seat to facilitate the turning of the valve.

One of the objects and accomplishments of my invention is to provide a lubricated plug valve with an improved and eminently satisfactory permanent metallic seal which eliminates the necessity for renewable packing.

An object of the present invention is the provision of an improved structure including resilient means and rigid stop means whereby the valve can only be lifted from its seat by a predetermined amount and whereby, as soon as the source of pressure is removed, the plug is immediately and positively returned to its seat. These results are accomplished by the elimination of ordinary composition packing, by use of a metal seal of a flexible nature and by use of relatively stiff springs of a very compact structure, which are adapted to permit the lifting of the plug only until they are deformed to seat, and which immediately return the plug to its seat when pressure is removed.

One of the sources of upkeep expense of the valves in the prior art is the composition packing which is customarily employed and which is subjected to pressure by a gland. Such packing loses its resiliency, and this results in leakage around the stem, and numerous adjustments of the packing gland are necessary and new packing rings are required, which must be compressed by these numerous adjustments before correct seating of the packing is again obtained. All of this trouble is eliminated according to the present invention by utilizing a metal seal of a flexible nature with spring means for holding the seal in its sealing position and for returning the plug promptly and positively to its seat after it has been lifted. Such a packing arrangement constantly retains its resiliency and requires no further adjustment after pressure has been once applied to the resilient springs which maintain the seal.

Springs heretofore proposed have exerted too great a pressure downward on the plug, providing sufficient tension is placed upon them to prevent the plug rising from its seat due to the piston effect of the line pressure; the excessive spring pressure downward on the plug taper causing the plug to seize and gall. The present spring can be adjusted to a very light downward force to seal the diaphragm under low line pressure, but will exert an enormous resistance to excessive rising of the plug from its seat due to the fact that increasing force with increasing rising is required to deform the spring leaves in the seat.

Other objects and advantages of the invention will be apparent from the following description and the accompanying drawings, in which similar characters of reference indicate similar parts in both views.

Referring to the accompanying sheet of drawings:

Fig. 1 is a vertical sectional view taken on a plane passing through the axis of the inlet and outlet ports, showing the plug in elevation and the valve body in section; and Fig. 2 is a fragmentary sectional view taken through the sealing arrangements located around the stem at the top of the plug on a plane which passes through the axis of the plug.

Referring to Fig. 1, 10 indicates the plug valve in its entirety and the valve includes a valve body indicated at 11, a valve plug 12 and a cover plate 13.

The embodiment which has been chosen to illustrate the invention happens to have the valve body of the flange type in which the two ports 14 and 15, either of which may be the outlet or inlet, are provided with cylindrical walls 16, 17 which terminate in a seating surface 18, 19 and are provided with radially extending flanges 20, 21.

The flanges 20, 21 have the usual apertures 22 which are used to secure these valves to the adjacent flanged pipe or other suitable conduits.

Intermediate the cylindrical wall portions 16, 17 the valve body is formed with a tapered frusto-conical bore or seat 23 which extends transversely to the direction of the ports 14, 15, and the tapered bore 23 extends above and below the conduits forming the ports 14, 15. At its lower end bore 23 communicates with a slightly enlarged chamber 24 which has a lower wall 25 closing the valve body at the lower end of the bore 23. At one side the chamber 24 is preferably provided with a tubular extension 26 having an inner threaded bore 27 for receiving a suitable pressure lubricant fitting 28 whereby lubricant under pressure may be supplied to the chamber 24.

Various types of lubricant fittings 28 may be utilized, but the one illustrated is of the type having a non-circular body 29 and a reduced threaded shank 30. The body 29 carries a head 31 in the form of a radially extending flange 32 which is separated from the body by a groove 33 preferably of rectangular shape. Body 29 may be provided with an outlet bore 34 and inlet bore 35 and an intermediate enlarged counterbore 36. Counterbore 36 is preferably provided with a check valve 37 comprising a disc which seats against a suitable gasket 38 and which is urged in that direction by a compression coil spring 39.

Disc 40 may have a rearwardly extending skirt to provide a cylindrical guide sleeve 41 slidably mounted in the bore 36.

The external shape of the body 42 of the valve is also generally frusto-conical tapering from the top to the bottom, the body projecting slightly below the cylindrical portions 16, 17 and also projecting slightly above its cylindrical flanges, the upper projection of the body being indicated at numeral 43.

At its upper end the frusto-conical bore 23 is open and it is closed by the cover plate 13 which has a plurality of regularly spaced securing flanges 44 with apertures for receiving the stud bolts 45 carrying the nuts 46. At the points where these bolts 45 are to be located the wall of the body 42 is also thickened and provided with threaded bores for receiving the studs 45. The body 42 is provided at its open end with an annular seating surface 47 surrounded by a counterbore 48 and the cover 13 has a lower seating surface 49 which extends to an outer cylindrical surface 50 which fits in the counterbore 48.

Beyond the cylindrical surface 50 the external outline of the cover 13 may assume any desired shape, but is preferably substantially circular, except for the radially extending ears 44 which are used for the securing bolts 45. Cover 13 is provided with a centrally located cylindrical bore 51 for receiving and guiding a pressure ring 52 and for housing a plurality of annular springs 53.

Cylindrical bore 51 communicates with a larger threaded bore 54 for receiving the threaded portion of the gland 55 which surrounds the stem 56 of the plug 12.

Cover 13 also preferably has an upwardly extending partially annular stop wall 57 comprising a cylindrical flange which may extend over one-quarter of a revolution. Two such stop walls 57 are preferably located diametrically opposite to each other at the opposing quarter of a circle surrounding the stem. This leaves two open portions about 90° each for movement of the stop member or wrench. The flat end surface of each may serve as stops for engaging a wrench or handle and opposing stop shoulder, and so constructed that the plug can only be turned in one way, that is, in a clockwise direction looking from the top of Fig. 1, so that the vertical lubricant grooves on the plug will never be exposed in the conduits leading to the inlet or outlet ports 14, 15.

Plug 12 comprises a frusto-conical metal member in the form of a truncated cone tapered from the top toward the bottom and complementary in shape to the tapered bore 23. Plug 12 may be provided with a plane bottom surface 59 and with a plane top surface 60.

At its upper end the plug 12 preferably carries an integral stem 56 comprising a cylindrical extension, the outer cylindrical surface 61 which has a rotating fit in the bore 62 of the gland 55.

The extreme upper end of the stem 56 may be non-circular, for example, it may be provided with flattened sides 63, 64 for engagement in a complementary aperture in a wrench or handle.

The length of the plug 12 and the size of its body is such that it will have its upper plane surface 60 located substantially below the annular seating surface 47 when the plug is tightly seated in its bore.

The plug and stem are preferably provided with improved sealing means in the form of a flexible metallic diaphragm 65 of sufficient size and circular in shape to fit in the bore 48.

Diaphragm 65 may be made of any suitable metal, such as stainless steel, and it is provided with a centrally located cylindrical aperture 66 for passing the cylindrical portion 61 of stem 56. Immediately above the flexible diaphragm 65 there is located an asbestos gasket 67 which is of exactly the same shape and is located about the stem 56, except that it is above the diaphragm 65.

A fluid-tight seal is provided between the diaphragm 65 and the body 42 by the pressure of the seating surface 49 of cover 13 against the seating surface 47 brought about through the intermediary of the nuts 46 and the bolts 45.

The gasket 67 is engaged about the stem 56 by a steel backing ring 52 which is provided with a central bore 68 for receiving the stem 61 and with the external cylindrical surface 69 to be received in the bore 51 of cover 13. Backing ring 52 may have a lower plane surface 70 engaging the gasket 67, but it preferably has an upper dished annular surface 71 into which the springs 53 may be bent. The shape of this dished surface may vary from a convex curved surface to a groove of rectangular shape, but the shape of the backing ring and adjacent parts are substantially shown in Fig. 6.

Such a groove is indicated at 71 and is bordered at each side by an upwardly extending annular flange 72 having a plane upper surface 73. Above the backing ring 52 in the bore 51 about the stem 56 there are a plurality of spring members 53 comprising resilient spring leaves, each of which is an annular member having a circular outer boundary fitting in the bore 51 and a central bore having a rotating fit with the stem 56. These spring leaves may be made of spring steel such as, for example, steel having 0.95 to 1.05 carbon. Any suitable number of spring leaves may be employed to secure the desired degree of stiffness of the assembly, such as one spring leaf, two, three, four, five, etc.

The maximum resiliency and minimum stiffness is accomplished by a single spring leaf, but the use of two spring leaves is shown in the embodiment illustrated.

The gland 55 may comprise a tubular steel member having a central bore 62 for receiving the stem 56 and having an upper non-circular portion 74 for receiving a wrench. At its lower end the external surface of the gland is threaded at 75 to be received in the threaded bore 54. The lower edge of the gland is formed with a curved annular convex surface 76, the apex of this curved annular surface forming a circular line of contact with the uppermost spring leaf 53 at a point midway between the edge of the ring and the bore of the ring.

The operation of this sealing arrangement is as follows: The gland 55 is tightened by means of a wrench until a predetermined pressure is placed upon the springs 53 which are caused to arch downward into the recess 71. The pressure does not, of course, go beyond the elastic limit of the spring leaves 53 which tend to return to their flat condition and urge the backing ring 52 downward against the gasket 67 and flexible diaphragm 65.

Diaphragm 65 is urged into a tight sealing engagement with the upper plane surface 60 over an area substantially equal to the area of the backing ring 52 immediately adjacent the stem 56. This sealing engagement is maintained at all times but the springs 53 are still permitted an additional amount of resilient movement into the recess 71 which will permit the plug 12 to be lifted from its seat 23 by the application of a suitable pressure from below the plug 12. Such a pressure may be applied by means of suitable lubricant which is present in the chamber 24, the pressure being applied by means of the pressure fitting 28 and a suitable lubricant gun of high pressure being attached to said fitting.

The plug 12 is, of course, provided with the through port 77 comprising an opening extending through the plug at right angles to the axis of the plug and affording passage through the valve when the plug is open. This port 77 may be substantially rectangular in cross section, with rounded corners leaving sufficient body on either side of the port 77 for suitable lubricant bores, etc.

In order to provide for a source of lubricant under pressure to seal the valve against leakage past the sides of the plug 12, the plug may be provided with a longitudinally extending groove 78, 79 on each of its sides adjacent the border of the plug port 77. Groove 78 may be half cylindrical in shape and preferably extends from a point slightly below the port 77 to a point slightly above the port 77. Each of the grooves 78 and 79 is diametrically opposed to the other and these grooves are located on that side of the port 77 which turns away from the inlet and outlet ports 14, 15 of the valve body when the valve is being closed.

Thus, the grooves 78, 79 are never moved into the stream of fluid which passes through the valve, but these grooves 78, 79 wipe across the closed portion of the frusto-conical wall 23 and cover an area which extends above and below the inlet and outlet ports 14. On each closing or opening movement of the valve the grooves 78 being filled with lubricant they are adapted to lubricate this large area of frusto-conical wall of the port 23. During the time when the valve is closed there is a solid wall of lubricant in the grooves 78, 79 which resists leakage past the sides of the plug.

Grooves 78, 79 are supplied with lubricant for the body as shown in Fig. 1, by radially extending bores 80—81 which lead from a central bore 82 of the stem 56 to the tops of the bores 78, 79. The bore 82 in the stem serves to house a supply of lubricant, a check valve and suitable pressure supplying device in the form of a threaded plunger 83, the lower threaded portion of which 84 is threaded into a threaded bore 85 in the stem 56. The shank 86 of this threaded plunger may be reduced in size and provided with a non-circular head 87 for receiving a wrench, the head also having a transverse aperture 88 for receiving a pin, so that either the pin or the wrench may be used for this purpose.

The check valve 89 is located in the lower end of bore 85 being threaded into a suitable counterbore, and this check valve is adapted to prevent the return of lubricant into the chamber 90. Check valve 89 may be of any suitable type.

In addition to the longitudinal grooves 78, 79 the plug 12 is preferably provided with a wave-like peripherally extending groove 101 located above the port 77 in the outer frusto-conical wall of the plug. This groove 101 is preferably sinuous in a vertical direction curving gradually upward and downward as it progresses about the periphery of the plug. The wave-like groove 101 communicates with a radially drilled conduit 102 which communicates with a vertically drilled conduit 103 leading to the bottom of the plug to communicate with the chamber 24 in Fig. 1. Thus, the wave-like groove 101 receives this lubricant from the chamber 24 and seals the joint between the plug and the housing above the port 77. By reason of this wave-like form, the groove 101 spreads lubricant over an annular area equal to the width extending from the lowermost side of groove 101 to the wall at the uppermost portion of groove 101.

The operation of my lubricated plug valve is substantially as follows:

When the valve is in open position, the lubricant in the grooves 78, 79 is not exposed to the flow of liquids passing through the valve, as the grooves 78, 79 never become exposed inside the inlet or outlet ports 14 or 15. When the valve is turned from open position to closed position, the lubricant in the grooves 78 and 79 is wiped across the area of the frusto-conical seat 23 which is located between the positions of these grooves in the closed and in the open position of the plug. This film of lubrication, as well as the constant supply in the grooves 78, 79, provides a seal against leakage of the liquid past the sides of the plug.

The wave-like groove at the top likewise lubricates a band of plug and seating surface at the top and tends to prevent leakage past the upper part of the plug.

The reservoir 24 is constantly full of lubricant, and when it is desired to unfreeze a valve additional lubricant under pressure may be supplied through the fitting 28 to lift the plug off its seat, by a predetermined amount, as for example, .003 of an inch, this being half of the clearance of .006 in the annular depression of the backing ring 52, the other .003 having been taken up in placing a predetermined tension on the resilient leaf springs 53.

When the plug is thus lifted from its seat, lubricant from the chamber 24 tends to move up into the annular crack around the plug on all sides, thus tending to lubricate all of the surfaces of the plug so that the plug can be very easily turned. When this pressure has been relieved in the chamber 24, either by the lubricant leaking upward around the sides of the plug or by other means, the plug will immediately reseat itself, which is not possible with the devices of the prior art utilizing a composition packing.

The flexible diaphragm 65 is adapted to permit this amount of motion while constantly maintaining a fluid-tight seal underneath the backing ring 52 where the diaphragm 65 engages the upper surface 60 of the plug 12.

The lubricant used in the bottom chamber 24 might be relatively cheap, but good lubricant, which need not necessarily be highly resistant to the materials which are carried through the valves from the standpoint of either decomposition or solution. More than 80% of the seating surface of the plug would be directly lubricated from the bottom chamber 24 in which a relatively inexpensive gun grease could be used with good results. The remainder of the seating surface will also receive a considerable amount of lubricant from the same source, which will tend to cut away and clean it of partially decomposed, sticky, heavy semi-solid lubricants or plastics, which may be used for sealing the ports by pressure lubricant system connected to the stem of the valve. The stem lubricating system may be used exclusively for effecting sealing of the port and that section of the seat that is exposed to line solution by either a special grease or plastic material. The bottom chamber of the housing may be used for the hydraulic lift and lubrication at all points where the surface never comes in direct contact with the line solution.

In the embodiment of Fig. 1 a plastic material or a packing material, which is not necessarily a lubricant, can be used in the stem system in place of a lubricant or a grease, this material being used primarily as a seal. Then a relatively cheap lubricant can be used in the bottom chamber, and this lubricant will be furnished to most of the seating surfaces from the bottom fitting to free the plug and obtain ease in turning the plug.

The use of a metallic seal instead of composition packing contributes to less upkeep and longer service life and permits the axial movement of the plug by the springs which are definitely limited in their movement, so that lubricant cannot be wasted, as distinguished from the prior art devices.

Adjustments of packing are not necessary, and the plug is rapidly returned to its seat after the lifting operation, so that the present plug valve is adapted to effect a complete shut-off at once.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a lubricated valve a housing provided with inlet and outlet ports and with a tapered seat for a rotary plug member, a rotary plug mounted in said housing and engaging said seat, said plug being provided with a port for communication with the inlet and outlet ports of said housing, said plug being provided with a stem adapted to project from said housing to be used in turning the plug, said plug having an annular seating surface on the same end of the plug as said stem, diaphragm sealing means having a leak-tight connection with said housing and having a sliding engagement with said annular seating surface on said plug, and resilient means for urging said plug into engagement with its seat in said housing and comprising an annular spring member reacting against said diaphragm means, and means for effecting flexure of said spring member along an annular line located between the inner and outer boundaries of said annular spring member, the last mentioned means comprehending an annular closure member carried by said housing and having an annular surface for engaging said spring member, said annular surface being curved to provide a circular apex which engages the spring member between its inner and outer boundaries, and a backing member located between said diaphragm means and said spring member, said backing member being formed with a pair of annular backing surfaces and an intermediate annular recess, said backing surfaces engaging said spring member adjacent the inner and outer boundaries of said spring member, means for applying pressure to said plug to move it from said tapered seat against the biasing force of said annular spring member, and said intermediate annular recess of the backing member having a depth such that it restricts the flexure of said annular spring member to a predetermined amount and thereby limits the movement of the plug from its seat.

2. In a lubricated valve a housing provided with inlet and outlet ports and with a tapered seat for a rotary plug member, a rotary plug mounted in said housing and engaging said seat, said plug being provided with a port for communication with the inlet and outlet ports of said housing, said plug being provided with a stem adapted to project from said housing to be used in turning the plug, said plug having an annular seating surface on the same end of the plug as said stem, diaphragm sealing means having a leak-tight connection with said housing and having a sliding engagement with said annular seating surface on said plug, and resilient means for urging said plug into engagement with its seat in said housing and comprising an annular spring member reacting against said diaphragm means, and means for effecting flexure of said spring member along an annular line located between the inner and outer boundaries of said annular spring member, the last mentioned means comprehending an annular closure member carried by said housing and having an annular surface for engaging said spring member, said annular surface being curved to provide a circular apex which engages the spring member between its inner and outer boundaries, and a backing member located between said diaphragm means and said spring member, said backing member being formed with a pair of annular backing surfaces and an intermediate annular recess, said backing surfaces engaging said spring member adjacent the inner and outer boundaries of said spring member, hydraulic means including a chamber enclosing the end of said plug opposite said annular spring member for moving said plug from its seat against the biasing force of said annular spring member, and means including said backing member providing a positive stop for limiting the movement of said plug against the biasing force of said spring member.

3. In a lubricated plug valve having an annular tapered plug with a plane sealing surface at one end and seated in a tapered seat of a valve housing, the combination comprising a sealing diaphragm having a leak-tight connection to the valve housing and slidably engaging the plane sealing surface of the plug, and means forcibly pressing said diaphragm into sealing engagement with said sealing surface and biasing the tapered plug into seated relationship with said tapered seat, said means comprising an annular backing member having a plane surface for engaging the diaphragm and an annularly channeled surface opposite the plane surface thereof and presenting radially spaced marginal beads of substantially the same height on opposite sides of the annular channel, an annular leaf spring of substantially the same diameter as the backing member engaging said beads, and a member adjustably secured to said housing and presenting an annular apex engaging said leaf spring on the side thereof opposite the beads and at a radius substantially midway between the beads, so as to flex the leaf spring annularly into the channel and bow the spring radially, and the spacing of said beads and the depth of said channel being such that the spring bottoms in the channel to provide a stop before the elastic limit of the spring is exceeded.

JOYE C. HAUN.

REFERENCES CITED

The following references are of record in the file of this patent:

UNITED STATES PATENTS

| Number | Name | Date |
|---|---|---|
| 1,944,995 | Nordstrom | Jan. 30, 1934 |
| 1,961,102 | Fennema | May 29, 1934 |
| 2,012,427 | Haun | Aug. 27, 1935 |
| 2,229,120 | Nordstrom | Jan. 21, 1941 |
| 2,255,182 | Nordstrom | Sept. 9, 1942 |
| 2,281,697 | Kerr | May 5, 1942 |

FOREIGN PATENTS

| Number | Country | Date |
|---|---|---|
| 256,098 | Great Britain | Aug. 5, 1926 |